(12) United States Patent
Murphy

(10) Patent No.: US 8,490,506 B2
(45) Date of Patent: Jul. 23, 2013

(54) IN-SITU GAS ANALYZER PROBE

(75) Inventor: Daniel Murphy, Marlborough, MA (US)

(73) Assignee: AA Holdings, Ltd., Wilmington, DE (US)

( * ) Notice: Subject to any disclaimer, the term of this patent is extended or adjusted under 35 U.S.C. 154(b) by 608 days.

(21) Appl. No.: 12/683,476

(22) Filed: Jan. 7, 2010

(65) Prior Publication Data
US 2010/0175865 A1    Jul. 15, 2010

Related U.S. Application Data

(60) Provisional application No. 61/143,876, filed on Jan. 12, 2009.

(51) Int. Cl.
*G01D 21/00*    (2006.01)
(52) U.S. Cl.
USPC .......................................................... 73/866.5

(58) Field of Classification Search
USPC ................................ 73/863.41–863.61, 866.5
See application file for complete search history.

(56) References Cited

U.S. PATENT DOCUMENTS 4,485,665 A * 12/1984 Norman ........................ 73/29.01

\* cited by examiner

*Primary Examiner* — David A. Rogers
*Assistant Examiner* — Alex Devito
(74) *Attorney, Agent, or Firm* — Sampson & Associates, P.C.

(57) ABSTRACT

A probe mounted directly to a conduit conveying a process stream of gas to be analyzed, which can condition a continuous sample of the gas before it is analyzed by removing undesirable vapor components of the sample through interaction with a heat exchanger conduit which condenses these components into a liquid such that they precipitate under the force of gravity back into the process stream. The probe uses a Venturi device to motivate the gas through a flow cell chamber where it interacts with light shown through the chamber before ejecting the sample back into the process stream through a sample return conduit.

27 Claims, 2 Drawing Sheets

IN-SITU GAS ANALYZER PROBE

CLAIM OF PRIORITY

This application claims priority as a non-provisional application of U.S. provisional patent application Ser. No. 61/143,876; filed on Jan. 12, 2009.

BACKGROUND

This invention relates to a probe for conditioning a fluid sample to be analyzed having one or more undesirable components entrained therein. In particular, it relates to a system that can very precisely cool the sample to remove just the undesirable components through condensation. In a process gas stream it is often desirable to know the concentration of one or more compounds that make up the process stream. This concentration knowledge allows feedback to be sent to an operator(s) or equipment in the process that can make changes based on the information obtained. For example, in a Claus sulfur recovery process $H_2S$ and $SO_2$ are reacted to produce elemental sulfur and water. By analyzing the concentration of $H_2S$ leftover in the tail-gas from the reaction, feedback can be provided that can be used to adjust the amount of $H_2S$ being supplied to the reaction. However, analysis of the tail-gas is complicated by the presence of elemental sulfur vapor which distorts the readings obtained from a spectrometer, and which can solidify on the analyzing equipment's interior surface. Therefore it is an object of the present invention to provide an in-situ probe that can remove sulfur vapor from a process gas stream by condensing the vapor into a liquid such that it precipitates into the process stream before it can accumulate on the analyzing equipment's interior surface.

SUMMARY OF THE INVENTION

A sample of a process gas steam, which contains at least one undesirable component such as sulfur vapor, is conveyed by means of a Venturi device into a sample chamber where it interacts with a heat exchanger conduit. The heat exchanger conduit conveys a cooling fluid, such as steam, through a separate chamber that is not in fluid communication with the sample chamber as to preclude mixing of the cooling fluid and sample, but allows for heat transfer from the process gas steam sample to the cooling fluid through the wall of the heat exchanger conduit. The temperature of the cooling fluid is precisely controlled—in the case of steam this is accomplished by regulating the pressure of the steam—so that the undesirable component of the process gas steam sample will condense into a liquid. The undesirable component of the process gas steam sample precipitates out of the sample and falls under the force of gravity back into the process gas stream. In the case of sulfur being the undesirable component, it is of paramount importance that the temperature of the cooling fluid be very precisely controlled, because the pressure in a Claus process tail-gas line is kept below atmospheric pressure to prevent the possibility of gas leaking from the pipes, and at this sub-atmospheric pressure sulfur only exists in a liquid state within a very narrow temperature range. The reason pressure control is important is because if the temperature of the cooling fluid were to be too low, sulfur vapor will solidify on the surface of the heat exchanger conduit and insulate it such that the process gas steam sample will be able to pass by without its sulfur vapor content being removed, conversely, if the temperature of the cooling fluid is too high sulfur vapor will not condense leading to the same problem. Therefore, it is a critical aspect of this invention that the system can be adjusted such that sulfur can be condensed to a liquid through interaction with the heat exchanger conduit. After interaction with the heat exchanger conduit the process gas steam sample travels through an orifice in the bottom of a probe head manifold and into a flow cell chamber. The flow cell chamber is cylindrical with an inlet and outlet orifice for the process gas steam sample to enter and exit the flow cell chamber which is aligned perpendicular to the longitudinal axis of the sample chamber, and an optical inlet and outlet orifice with one in each and of the flow cell chamber aligned parallel and concentrically with and the longitudinal axis of the flow cell chamber such that a beam of light can be shown through the flow cell chamber entering through the optical inlet orifice and exiting through the optical outlet orifice. In this way some wavelengths of light being shown through the chamber will be absorbed by the sample in accordance with Beer-Lamberts law, and the light exiting the chamber can be analyzed by a spectrometer to identify the components of the process gas steam sample in the flow cell chamber.

The flow cell chamber is also in close proximity to a demister which conveys a heating fluid, such as steam, through a serpentine channel. The serpentine channel is positioned in such a way that it is not in fluid communication with the flow cell chamber, which precludes mixing of the heating fluid and the process gas steam sample, but allows for heat transfer from the heating fluid to the process gas steam sample through the wall of the flow cell chamber. The demister further comprises a heating fluid inlet and outlet orifice to allow the heating fluid to enter the serpentine channel through one end and exit through the opposite end. This heating fluid system allows the temperature of the flow cell chamber to be held at a point above the condensation temperature of all components of the process gas steam sample so that liquids and solids do not accumulate in the chamber and block the flow of the process gas steam sample and light through the chamber.

After the process gas steam sample exits the flow cell chamber it passes through the Venturi device where it mixes with an aspirating fluid, such as air, and is conveyed through a sample return conduit, which is housed in the sample chamber but not in fluid communication therewith, before being ejected back into the original process fluid downstream of the inlet of the sample chamber.

DETAILED DESCRIPTION OF THE INVENTION

Figure 1:
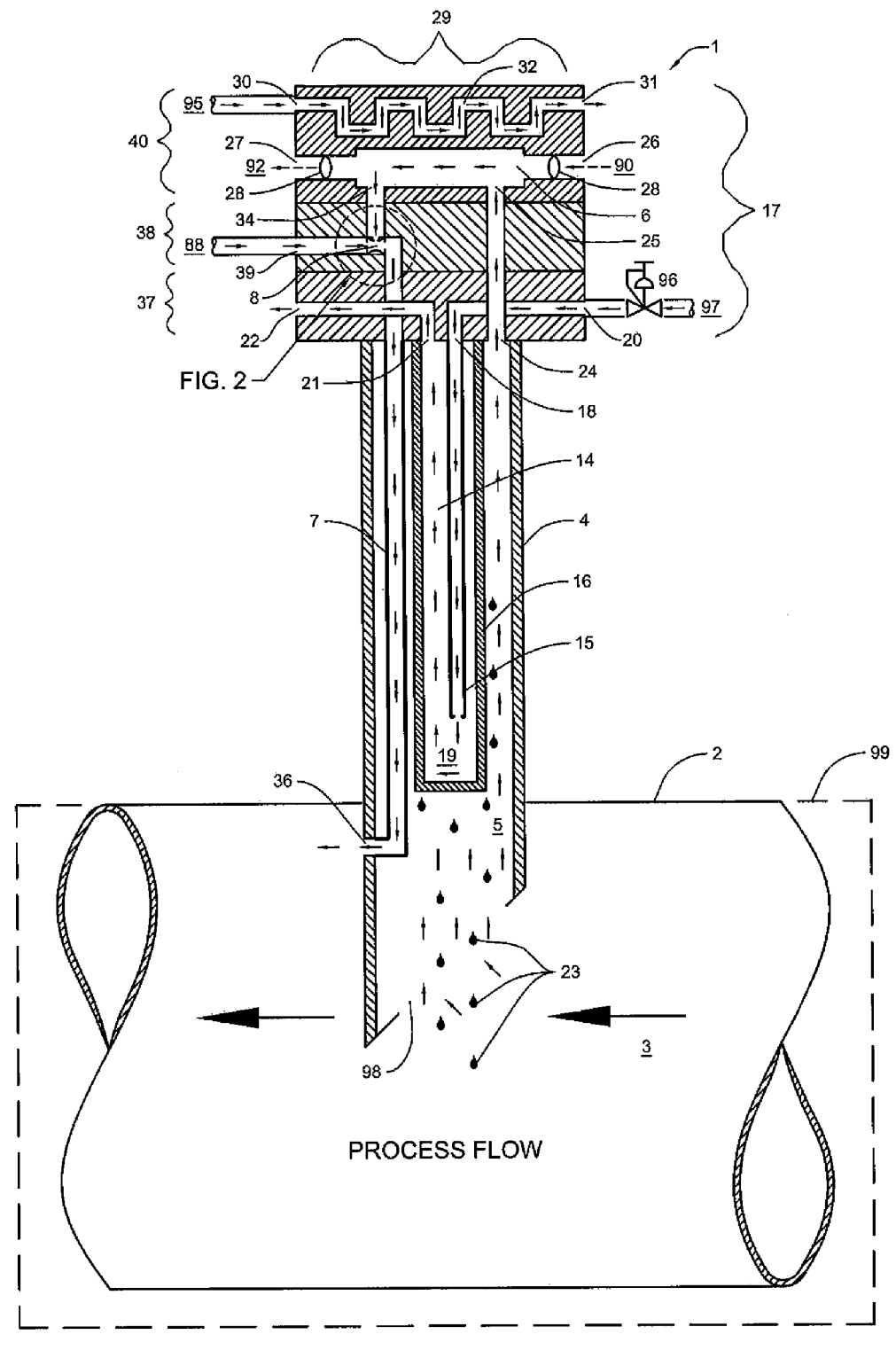
FIG. 1 depicts the preferred embodiment of the present invention.

In reference to the drawing, it is to be understood that the depiction therein is for illustration of a preferred embodiment of the invention, and the invention is not limited thereto.

As shown in FIG. 1, an in-situ gas analyzer probe 1 is mounted to a process pipe 2 carrying tail-gas 3 in a conventional Claus sulfur recovery operation (represented by box 99). The tail-gas is made up of multiple components including $H_2S$, $S_2$, and $H_2O$, and is held at a pressure below atmospheric pressure and a temperature where all components exist in a vapor form. The tail-gas passes by the bottom end of a sample chamber 4 which extends, preferably approximately ⅔ of the way, into the process pipe 2. The bottom end of sample chamber 4 is cut at an angle of approximately 45 degrees to the longitudinal axis of the process pipe 2 and oriented to form an opening 98 that faces the oncoming flow. The opening 98 is cut at an angle in order to increase the opening's area that is perpendicular to the flow in the process pipe 2 to facilitate the flow of a sample 5 of the tail-gas 3 into sample chamber 4.

Figure 2:
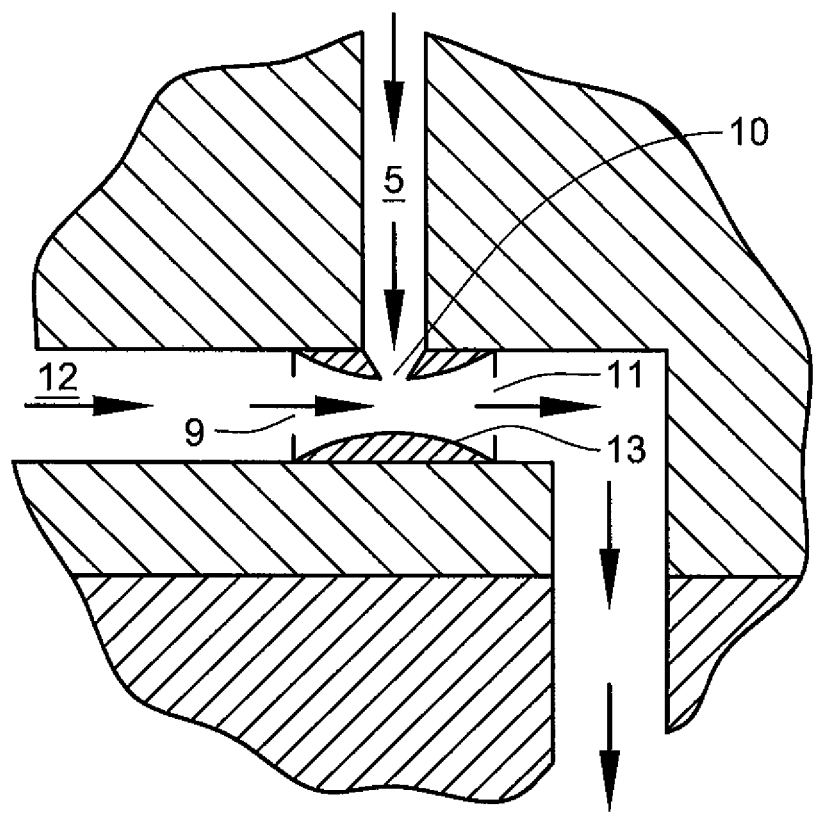
FIG. 2 shows a detailed view of the Venturi device of FIG. 1 shown in circle 2.

The tail-gas sample 5 is motivated through the sample chamber 4, a flow cell chamber 6, and a sample return conduit 7 by a Venturi device 8. Referring now to FIG. 2, the Venturi device 8 comprises an aspirating fluid inlet orifice 9, a sample inlet orifice 10, and a common outlet orifice 11. The Venturi device 8 operates by flowing an aspirating fluid 12, such as air, into the aspirating fluid inlet orifice 9 where it is conveyed through a bottleneck constriction area 13. The bottleneck constriction area increases the velocity of the aspirating fluid 12 and consequently lowers the pressure within the bottleneck constriction 13 in accordance with Bernoulli's principal. The sample inlet orifice 10 is located near, but preferably at, the midpoint of the bottleneck constriction area 13, such that when sized properly the pressure in the bottleneck constriction area 13 is lower than that of the tail-gas sample 5 upstream of the sample inlet orifice 10. That pressure differential causes the tail-gas sample 5 to flow through the sample inlet orifice 10 into the bottleneck constriction area 13 wherein the tail-gas sample 5 mixes with the aspirating fluid 12 and exits the Venturi device 8 through the common outlet orifice 11.

Reverting to FIG. 1, the sample chamber 4 houses a heat exchanger conduit 14. Heat exchanger conduit 14 is comprised of an inner tube 15 and an outer tube 16 of different diameters such that the inner tube 15 fits inside the outer tube 16, and of different lengths such that the inner tube 15 is shorter than the outer tube 16. Both the inner tube 15 and the outer tube 16 are aligned such that one end of each is coplanar with the end of the sample chamber 4 opposite the end through which the tail-gas sample 5 is entering, and the coplanar end of the inner tube 15, outer tube 16, and sample chamber 4 are flush against the flat bottom side of a probe head manifold 17.

The circumference of inner tube 15 on the coplanar end encircles a cooling fluid inlet orifice 18 in the bottom of the probe head manifold 17; such that a cooling fluid 19, such as and not limited to steam, can be conveyed from a cooling fluid source 97. The cooling fluid source 97 provides the cooling fluid 19 into the probe head manifold 17 through a connection inlet orifice 20, the inlet orifice then directs the cooling fluid 19 through the interior volume of the inner tube 15. The cooling fluid 19 can then pass out of the bottom end of the inner tube 15 opposite the coplanar end, and enter the space encapsulated by the outer tube's 16 inside diameter and the inner tube's 15 outside diameter. The cooling fluid 19 then passes through a cooling fluid outlet orifice 21 in the bottom of the probe head manifold 17 that is encircled within the outer tube's 16 circumference but not the inner tube's 15 circumference. The cooling fluid 19 exits the probe head manifold 17 through a cooling fluid connection outlet orifice 22. The end of the outer tube 16 opposite the coplanar end is, obviously, sealed so as to preclude the mixing of the cooling fluid 19 with the tail-gas sample 5 in the sample chamber 4, and allows for heat transfer between the tail-gas sample 5 and the cooling fluid 19 through the wall of the heat exchanger conduit 14, in particular the outer tube's 16 walls.

The tail-gas sample 5 in the sample chamber 4 flows past the heat exchanger conduit 14 where thermal energy is exchanged between the tail-gas sample 5 and the cooling fluid 19. In normal operation the temperature of the cooling fluid 19 is kept below the tail-gas sample's 5 temperature so that heat is transferred from the tail-gas sample 5 to the cooling fluid 19. In the preferred embodiment of the present invention the cooling fluid 19 is steam in which case the temperature of the cooling fluid 19 can be adjusted by regulating the pressure of the steam within a conventional pressure regulator 96.

The pressure of the cooling fluid 19 (preferably steam) must be precisely controlled such that the temperature of the steam will cool the tail-gas sample 5 to a point where the $S_2$ component will condense into a liquid, and not to a point that it will freeze into a solid. The liquid sulfur 23 then precipitates under the force of gravity against the flow of tail-gas sample 5 and passes back through the bottom end of a sample chamber 4 and into the process pipe 2, as illustrated in FIG. 1.

The tail-gas sample 5 exits the sample chamber 4 though a sample supply orifice 24 in the bottom side of the probe head manifold 17, and flows through a sample inlet orifice 25 into flow cell chamber 6.

The flow cell chamber 6 is cylindrical with an optical inlet orifice 26 on one end of the flow cell chamber 6 and an optical outlet orifice 27 on the opposite end. Both optical inlet orifice 26 and optical outlet orifice 27 are aligned parallel to, and concentrically upon, the longitudinal axis of the flow cell chamber such that a beam of light (depicted by broken arrows) can be shown through the flow cell chamber 6. Optical inlet orifice 26 and optical outlet orifice 27 each contain a lens 28 which allows the light to pass through the flow cell chamber 6, but precludes the tail-gas sample 5 from escaping.

The light is generated by a conventional light source 90, that radiates specific wavelengths, or specific ranges of wavelengths that are required to properly analyze components and concentration of components in the tail-gas sample. In this way some wavelengths of light being shown through the flow cell chamber 6 will be absorbed by the sample in accordance with Beer-Lamberts law. The light exiting the flow cell chamber 6 can be analyzed by a conventional spectrometer 92 to identify the components of the process gas steam sample in the flow cell chamber 6.

Flow cell chamber 6 is in close proximity to a demister 29. The demister 29 comprises a heating fluid inlet orifice 30, a heating fluid outlet orifice 31, and a serpentine channel 32. A heating fluid, such as steam, from a heating fluid source 95, enters the serpentine channel 32 through the heating fluid inlet orifice 30 and is conveyed through the convoluted path of the serpentine channel 32 above the flow cell chamber 6. The heating fluid then exits through the heating fluid outlet orifice 31. The heating fluid is hotter than the vaporization temperature of each component of the tail-gas sample 5 in the flow cell chamber 6 and keeps the tail-gas sample entirely in vapor form such that condensation will not form on the lenses 28 and solid particulates will not form and impede the flow of tail-gas sample 5 through the system.

The tail-gas sample 5 exits flow cell chamber 6 through a sample outlet orifice 34 and passes through the Venturi device 8. After passing through the Venturi device 8—which is described in detail above—, the tail-gas sample is then conveyed through sample return conduit 7 before being ejected back into the process pipe 2 through sample ejection orifice 36.

The probe head manifold 17 is comprised of three concentric discs of approximately the same diameter. The probe head manifold 17 is split into discs for manufacturability, maintainability, and to allow each part to be replaced without having to replace the entire probe head manifold. Despite this objective of the instant invention, those skilled in the art will recognize the probe head manifold can be made from one solid piece, or further divided into more than three discs depending upon the particular application in which it is used.

The bottom most disc 37 is directly connected to the coplanar ends of the inner tube 15 and outer tube 16 of the heat exchanger conduit 14 as well as the sample chamber 4, and comprises the cooling fluid connection inlet orifice 20, the cooling fluid connection outlet orifice 22, the cooling fluid inlet orifice 18, and the cooling fluid outlet orifice 21.

The middle disc 38 is directly connected to the top of the bottom most disc 37, and comprises the Venturi device 8 as well as an aspirating fluid connection inlet orifice 39. The aspirating fluid connection inlet orifice 39 is interconnected to an aspirating fluid source 88. The aspirating fluid source 88 provides the aspirating fluid 12, such as air, and pushes the aspirating fluid 12 into the aspirating fluid inlet orifice 9 as described above.

The top most disc 40 is directly connected to the top of the middle disc 38 and comprises the flow cell chamber 6 as well as the demister 29.

Over time a small amount of $S_2$ vapor will make it past the heat exchanger conduit 14 and freeze into a solid form elsewhere in the system. Therefore it is desirable to periodically raise the temperature of the cooling fluid 19 higher than the vaporization temperature of $S_2$. By occasionally raising the cooling fluid's temperature in the fluid inlet orifice 20, the heated cooling fluid temporarily heats the tail-gas sample 5 so that as the tail-gas sample 5 passes through the rest of the system it vaporizes any accumulated $S_2$, and in doing so effectively cleans the system without having to remove and disassemble the probe.

Although the present invention has been described and illustrated with reference to specific illustrative embodiments thereof, it is not intended the invention be limited to those illustrative embodiments. Those skilled in the art will recognize that variations and modifications can be made without departing from the spirit and scope of the claimed invention.

What is claimed is:

1. An in-situ probe for use in a sulfur recovery process comprising:
   a probe head manifold comprising a plurality of discs; said plurality of discs further comprising a cylindrical flow cell chamber, a serpentine channel, and a Venturi device;
   a sample chamber having one end directly connected to said probe head manifold and the other end open for immersion in a process fluid for conveying a continuous stream of said sample of said process fluid to said flow cell chamber, wherein said sample chamber contains a plurality of conduits, said conduits further comprising:
   a heat exchanger conduit for conveying a cooling fluid that is cooler than said sample from a first orifice in said probe head manifold, through the interior volume of said sample chamber, and through a second orifice in said probe head manifold;
   a sample return conduit directly connected to a third orifice in said probe head manifold, said third orifice being connected to said Venturi device for conveying said sample from said flow cell chamber to be ejected back into said process fluid.

2. The probe of claim 1 wherein said discs are aligned coaxially with one another.

3. The probe of claim 2 wherein said sample chamber has a longitudinal axis which is aligned coaxially with said discs.

4. The probe of claim 1 wherein said flow cell chamber comprises an optical inlet orifice and an optical outlet orifice concentrically aligned along the longitudinal axis of said flow cell chamber.

5. The probe of claim 4 wherein said flow cell chamber further comprises a sample inlet orifice and a sample outlet orifice aligned perpendicularly to the longitudinal axis of said flow cell chamber.

6. The probe of claim 1 wherein said serpentine channel is adjacent to said flow cell chamber and conveys a heating fluid that is hotter than said sample.

7. The probe of claim 6 wherein said serpentine channel comprises a heating fluid inlet orifice and a heating fluid outlet orifice in said probe head manifold.

8. The probe of claim 7 wherein said heating fluid raises the temperature of said sample in said flow cell chamber to a point where all components of said sample remain in a vapor state while inside said flow cell chamber.

9. The probe of claim 8 wherein said heating fluid is steam.

10. The probe of claim 1 wherein said Venturi device receives an aspirating fluid through an aspirator inlet connection orifice in said probe head manifold.

11. The probe of claim 10 wherein said Venturi device comprises a bottleneck for increasing the velocity of said aspirating fluid.

12. The probe of claim 1 wherein said sample chamber contains a sample return orifice aligned perpendicularly to the longitudinal axis of said sample chamber that is directly connected to said sample return conduit.

13. The probe of claim 1 wherein said heat exchanger conduit is aligned concentrically with the longitudinal axis of said sample chamber.

14. The probe of claim 13 wherein said heat exchanger conduit comprises two tubes wherein the outer tube is of larger diameter and of greater length than the inner tube.

15. The probe of claim 14 wherein said outer tube is aligned concentrically with the longitudinal axis of said sample chamber.

16. The probe of claim 15 wherein said first and second tube each have one end flush against said probe head manifold such that one end of each tube are coplanar.

17. The probe of claim 16 wherein the end of said second tube furthest from said probe head manifold is capped such that said cooling fluid cannot escape outside said heat exchanger conduit and said sample cannot enter said heat exchanger conduit.

18. The probe of claim 17 wherein said cooling fluid enters said inner tube through said flush end with said probe head manifold, then exits through the opposite end of said inner tube into the space between said inner tube and said outer tube and travels opposite the flow in said inner tube back into said probe head manifold.

19. The probe of claim 18 wherein said cooling fluid lowers the surface temperature of said heat exchanger conduit to a point above the freezing temperature and below the boiling temperature of one or more undesirable components of said sample so they will condense into liquid phase and precipitate against the flow of said sample under the force of gravity back into said process fluid as a liquid through said open end of said sample chamber.

20. The probe of claim 19 wherein said cooling fluid is steam.

21. The probe of claim 20 wherein said undesirable components comprise sulfur vapor.

22. The probe of claim 21 wherein the pressure of said steam is controlled by a pressure regulating means such that the surface temperature of said heat exchanger conduit can be controlled by adjusting said pressure regulating means.

23. The probe of claim 22 wherein said pressure regulating means is adjustable such that the temperature of said steam is above the condensation point of said sulfur vapor.

24. The probe of claim 23 wherein said pressure regulating means is adjustable such that the temperature of said steam is below the freezing point of said sulfur vapor.

25. The probe of claim 24 wherein said flow cell chamber is in optical communication with a gas analyzer that measures the concentration of said sulfur vapor in said flow cell chamber.

26. The probe of claim 25 wherein the pressure of said steam is raised or lowered in response to the concentration of sulfur vapor detected in said flow cell chamber by said gas analyzer such that the concentration of sulfur vapor in said flow cell chamber is minimized.

27. The probe of claim 26 wherein the pressure of said steam is raised periodically such that the heat exchanger conduit heats said sample significantly higher than the boiling temperature of said sulfur vapor such that any sulfur vapor that had previously condensed downstream of said sample chamber is re-vaporized and conveyed through said sample return conduit and ejected back into said process fluid.

\* \* \* \* \*